Jan. 7, 1936.　　　A. A. WARNER　　　2,027,078
UNIVERSAL JOINT
Filed Sept. 22, 1932
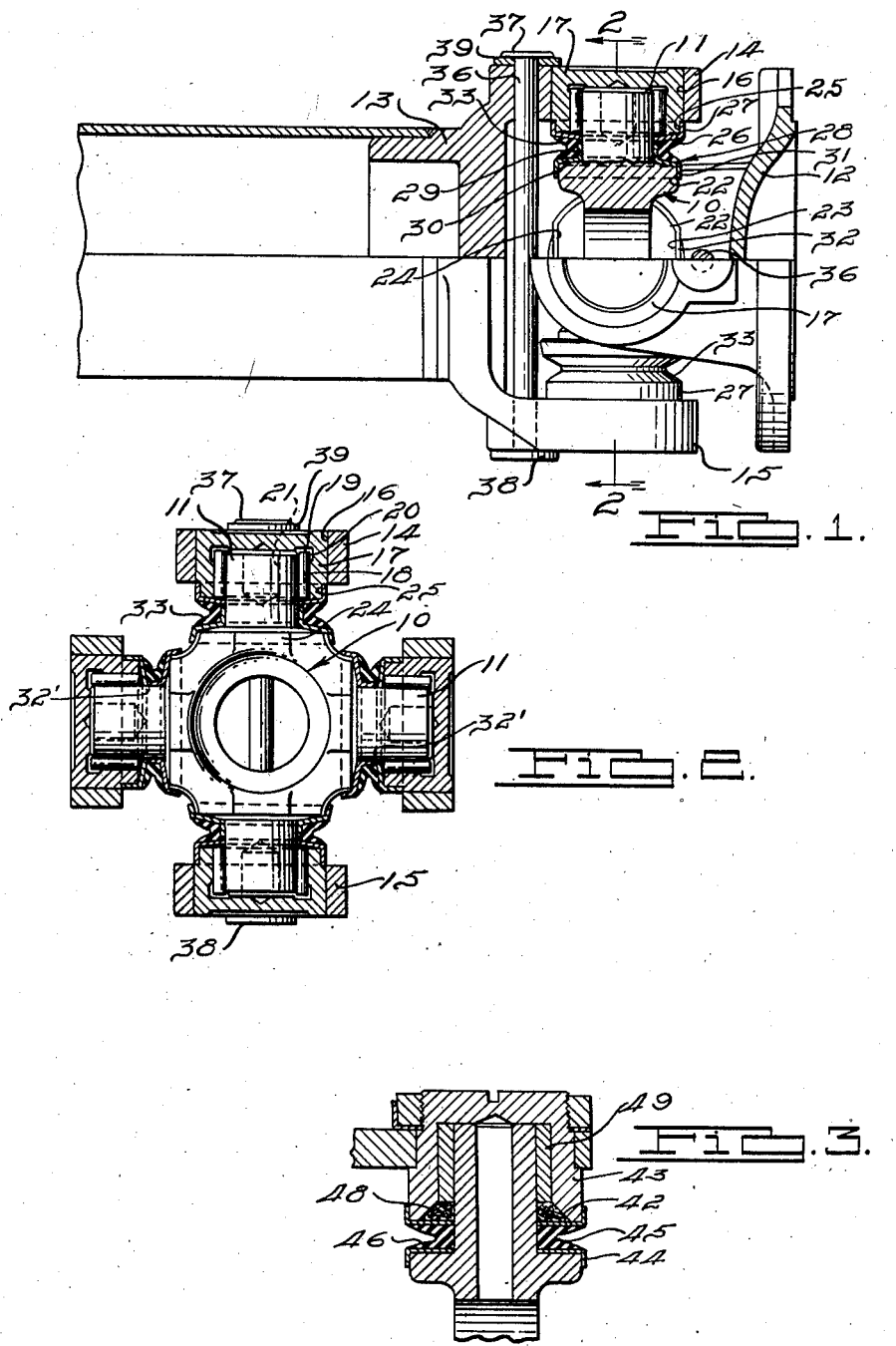
INVENTOR
Archibald A. Warner.
BY
Harness, Dickey, Pierce & Ham
ATTORNEYS.

Patented Jan. 7, 1936

2,027,078

UNITED STATES PATENT OFFICE 2,027,078

UNIVERSAL JOINT

Archibald A. Warner, Royal Oak, Mich., assignor to The Universal Products Company, Inc., a corporation of Delaware Application September 22, 1932, Serial No. 634,294

11 Claims. (Cl. 64—17)

The invention relates to joints for connecting shafts and it has particular relation to a joint which is of universal character.

One object of the invention is to provide a universal joint of simple construction although highly efficient in operation, to the end that a joint may be provided with minimum expense.

Another object of the invention is to provide an efficient and effective seal of improved character, for preventing dirt or other foreign matter from getting into the bearings in the joint.

Other objects of the invention will be apparent from the following description and the claims hereinafter set forth.

For a better understanding of the invention, reference may be had to the accompanying drawing forming a part of the specification wherein:

Figure 1 is a fragmentary view of a universal joint, shown partly in cross section, which may be constructed according to one form of the invention;

Fig. 2 is a cross sectional view taken substantially along the line 2—2 of Fig. 1;

Fig. 3 is a cross sectional view illustrating a trunnion and bearing cup therefor, wherein dirt excluding means are provided according to another form of the invention.

In manufacturing the joint illustrated, a spider 10 is provided which has four trunnions projecting therefrom disposed in 90 degree, circumferentially spaced relation. The shaft members which the joint connects, are indicated at 12 and 13 and each of said members has diametrically opposed arms 14 and 15 having cylindrical openings 16. The arms on one of the shaft members are disposed between the arms on the other member so that one shaft member may accommodate two of the trunnions on the spider and the other shaft member the other two of the trunnions.

For receiving a trunnion in each of the arms, a cup 17 fits in the opening 16, and between the side wall of this cup and the trunnion, roller bearings 18 are provided. It will be noted that at the ends of the bearings, the base of the cup 17 has an annular groove or recess 19 and adjacent this groove, the side wall of the cup has an annular recess 20, such recesses being provided to facilitate grinding the bearing surface on the side wall of the cup and assembly of the roller bearings therewith. Furthermore these grooves may serve as depositories for lubricant which initially may be provided in an opening 21 in the end of each trunnion.

The spider at the base of each trunnion is enlarged and of circular character as indicated at 22 excepting for diametrically opposed flat sides 23 and 24 and the particular purpose of this shape will presently be mentioned. The side wall of the bearing cup 17 at its open end, has an annular groove 25, and for preventing dirt and other foreign matter from gaining ingress into and around the roller bearings, sealing means are provided which include an annular, stamped metal ring 26 having a flange 27 at its outer edge, of such diameter that it may have a press fit in the groove 25. The sealing means also includes a second stamped metal ring 28 having a base portion 29, the inner diameter of which substantially corresponds to the outer diameter of the trunnion and which is adapted to fit thereon. The ring 28 also includes an outwardly directed portion 30 adapted to rest on the enlarged portion of the spider at the base of each trunnion, and a flange 31 adapted to extend around the enlarged base and which has diametrically opposed flat side portions 32 for engagement with the flat sides 23 and 24 of the enlarged portion.

The free edge of the base 29 of ring 28 is slightly spaced from the inner edge of the ring 26 as indicated at 32', and between the rings, sealing material such as rubber 33 may be provided. Preferably the rubber is bonded to the base of ring 28 and the side walls of the respective rings, by vulcanization and if the ring is composed of metal not readily susceptible to bonding by vulcanization, a thin coating of brass may be applied thereto prior to vulcanizing. The rings may be constructed of any suitable material such as sheet metal, and may be composed of sheet brass in which event the rubber may be readily bonded thereto without plating.

The sealing means may be manufactured as a separate article and then associated with the bearing cup by telescoping the flange 27 on ring 26 over the grooved portion 25 of the cup, it being understood that a press fit is obtained so that the sealing means is firmly associated with the cup and in a sealed manner. After the roller bearings are placed in the cups, which may be either before the sealing means is associated therewith or afterwards, the bearing cups are slipped over the ends of the trunnions projecting into the arms of the shaft members, and the ring 28 may be associated with the enlarged base portion of the spider adjacent each trunnion. A snug fit between the ring 28 and the trunnion and the base of the spider adjacent the trunnion is preferred, although a press fit is not absolutely necessary. Preferably before associating the sealing ring with the enlarged base of the spider, the flat side portions 32 of the ring are flared to a slightly larger diameter, until such side portions extend over the flat sides 23 and 24 of the base, and then the flat side portions of the ring may be pressed inward to positively engage the flat side portions of the base.

After the bearing cups are associated with the trunnions, a rivet may be inserted through each pair of arms 14 and 15, and a head formed at each end thereof as indicated at 37 and 38. A collar 39 may be provided between the head of one rivet and one of the arms if desired as this may facilitate forming the second head after the rivet is inserted. The heads or the one head and the collar 39, extend over the bearing cups and accordingly maintains them in position during operation of the joint.

The dimensions of the parts are such normally that in assembling the joint the rubber is placed under compression, it being apparent that the space 32' permits movement of the rings 26 and 28 for compressing the rubber. The space 32' also serves to compensate for slight variations in dimensions that may occur in the trunnion and cup assembly. Placing the rubber under compression is desirable as it more effectively insures hermetic sealing of the joint, and maintains the seal tight at all times during operation of the joint. Moreover, during normal relative turning of the rings 26 and 28 during operation of the joint, the initial compressed state of the rubber allows it to release and move without stretching.

During operation of the joint, it is apparent that the two shaft members may rotate together and relative to each other about their respective trunnions and that the flat side portions of the sealing rings 28 prevent turning thereof relative to the trunnions. Normally the rings 26 may rotate with the cups 17 and the shaft member on which they are mounted about the corresponding trunnions and some relative rotary movement of the members 26 and 28 and flexing of the rubber according to such relative movement may occur. However it will be appreciated that during normal operation of a universal joint, this relative movement is not great and accordingly the rubber will not be flexed undesirably and as a matter of fact some flexing of the rubber is desirable as it seems to promote its durability. The close fit between the member 28 and the base portion 29 thereof particularly with the trunnion, and the press fit between the member 26 and the cup, naturally will prevent dirt and other foreign matter from getting into the bearings along the inner faces of these members. The rubber ring between the members and which is bonded thereto naturally will positively prevent any dirt from getting into the bearings between the members while permitting necessary flexing and relative movement between the members as occurs consequent to any relative movement of the shafts and spider.

In the construction shown by Fig. 3, a slightly different type of sealing means is provided in which one ring indicated at 42 has a press fit with a cup 43 and another ring 44 may have a close and even press fit with the base of the trunnion. Between these members a rubber seal 45 may be provided and in this case a molded ring is preferred, although it might be bonded to the rings by vulcanization, which is recessed as indicated at 46 to promote flexibility thereof. This type of seal may be assembled by associating the rings 42 and 44 with the cup and spider respectively, and then prior to inserting the cup over the trunnion, inserting the sealing ring 45 over the trunnion, or if the rubber is bonded to the rings, the assembly may be applied as stated in connection with Figs. 1 and 2. Additionally a lubricant sealing gasket 48 may be provided between the roller bearings indicated at 49, and the sealing ring 42. In this construction also, it is preferred that the rubber be under initial compression when the joint is assembled.

It should be apparent that the hermetic seal provided may be used in other devices wherein members have limited relative turning movement, such as oscillatory movement. For example, the seal may be used in conjunction with shackles for vehicles or the like, wherein one member or arm turns relative to another, in a manner similar to the limited or oscillatory movement of the trunnion and the bearing cup therefor in the universal joint.

It may also be used to advantage in mills and factories to protect bearings of oscillatory parts where they are subjected to dirt, dust and abrasive.

1. In a universal joint, an oscillatory trunnion, a bearing cup for the trunnion, rings releasably fitted on the cup and trunnion respectively adjacent the open end of the cup, and rubber between the rings, said rings being rotatable respectively with the cup and trunnion, and the rubber being under compression and bonded to one of the rings.

2. In a universal joint having radially disposed trunnion members, a bearing cup member receiving each trunnion, rollers between each trunnion and the side wall of the cup, and sealing means between the inner end of the cup and the trunnion and comprising spaced plates fitting the cup and base portion of the trunnion respectively and a ring of rubber between the plates and adhering thereto, the plate on the cup having a portion projecting under the inner ends of the rollers so as to support the latter.

3. In a universal joint having radially disposed trunnion members, a bearing cup member receiving each trunnion, and sealing means between the inner end of the cup and the trunnion and comprising spaced plates fitting the cup and base portion of the trunnion respectively and a ring of rubber between the plates and adhering thereto, and means comprising a flat peripheral portion on one member engaging a complementary portion on the adjacent plate for preventing relative rotary movement of the member and plate.

4. A seal comprising a pair of plates, a rubber ring between the plates and bonded thereto, and means comprising an axially projecting portion on one plate for providing an axial seat for the inner periphery of the rubber.

5. A seal comprising a pair of plates, a rubber ring between the plates and bonded thereto so as to provide a unitary article, and flanges on the plates for fitting them respectively on relatively oscillatory members.

6. In a universal joint having radially disposed trunnion members, a bearing cup member receiving each trunnion, and sealing means between the inner ends of the cups and the trunnions, each sealing means comprising spaced plates fitting the cup and base portion of the trunnion respectively, a ring of sealing material between the plates and bonded thereto so as to provide a unitary article comprising the plates and sealing material, and means holding the plates on the trunnion and cup member respectively so as to substantially prevent rotation of each plate with respect to the member upon which it is mounted, the sealing material bonded to the plates flexibly permitting limited oscillatory movement of the plates and members about the trunnion axis.

7. In a universal joint having radially disposed trunnion members, a bearing cup member receiving each trunnion, and sealing means between the inner ends of the cups and the trunnions, each sealing means comprising spaced plates fitting the cup and base portion of the trunnion respectively, a ring of sealing material between the plates and bonded thereto so as to provide a unitary article comprising the plates and sealing material, and means holding the plates on the trunnion and cup member respectively so as to substantially prevent rotation of each plate with respect to the member upon which it is mounted, the sealing material comprising rubber and flexibly permitting limited oscillatory movement of the plates and members about the trunnion.

8. In a universal joint having radially disposed trunnion members, a bearing cup member receiving each trunnion, sealing means between the inner ends of the cups and the trunnions, each sealing means comprising spaced annular sheet metal plates fitting the bearing cups and bases of the trunnions respectively and one of which plates has an axially projecting inner leg to provide an annular base between the inner edges of the plates, a ring of rubber between the plates and seated on said base leg, and means for holding the plates on the trunnions and cups for rotation respectively therewith.

9. In a universal joint having radially disposed trunnion members, a bearing cup member receiving each trunnion, sealing means between the inner ends of the cups and the trunnions, each sealing means comprising spaced annular plates fitting the cup and base of the trunnions respectively and one of which has an axially projecting inner leg to provide an annular base between the inner edges of the plates, a ring of rubber between the plates seating on said base leg, and means for holding the plates on the trunnions and cups for rotation respectively therewith and including flanges on the plates, one of which has a press fit on the member upon which it is fitted.

10. In a universal joint having radially disposed trunnions, a bearing cup member receiving each trunnion, sealing means between the inner ends of the cups and the trunnions, each sealing means comprising spaced plates fitting the cup and base portion of the trunnions respectively and one of which has an axially disposed leg fitting the periphery of the trunnion and which provides a base between the inner edges of the plates, a ring of sealing material between the plates, and means for holding the plates on the trunnions and cup for rotation therewith respectively.

11. A seal comprising a pair of annular plates disposed in substantially radially, axially spaced planes, and a ring of rubber between the plates, the outer portion of the rubber ring being provided with an annular, substantial groove to promote flexibility when the plates are turned relatively.

ARCHIBALD A. WARNER.